US 11,156,146 B2

(12) United States Patent
Bauer et al.

(10) Patent No.: US 11,156,146 B2
(45) Date of Patent: Oct. 26, 2021

(54) ELECTRIC COOLANT PUMP

(71) Applicant: Mahle International GmbH, Stuttgart (DE)

(72) Inventors: Swen-Juri Bauer, Stuttgart (DE); Michael Baumann, Ammerbuch (DE); Andreas Gruener, Hattenhofen (DE); Andrea Teubner, Rainau-Schwabsberg (DE)

(73) Assignee: Mahle International GmbH

(*) Notice: Subject to any disclaimer, the term of this patent is extended or adjusted under 35 U.S.C. 154(b) by 0 days.

(21) Appl. No.: 16/349,595

(22) PCT Filed: Oct. 24, 2017

(86) PCT No.: PCT/EP2017/077191
§ 371 (c)(1),
(2) Date: May 13, 2019

(87) PCT Pub. No.: WO2018/086878
PCT Pub. Date: May 17, 2018

(65) Prior Publication Data
US 2019/0277183 A1    Sep. 12, 2019

(30) Foreign Application Priority Data

Nov. 14, 2016  (DE) .......................... 102016222307.0
Jan. 19, 2017  (DE) .......................... 102017200876.8

(51) Int. Cl.
*F01P 7/14*    (2006.01)
*F01P 7/16*    (2006.01)
(Continued)

(52) U.S. Cl.
CPC .................... *F01P 7/16* (2013.01);
*F01P 5/10* (2013.01); *F01P 5/12* (2013.01);
*F01P 7/14* (2013.01);
(Continued)

(58) Field of Classification Search
CPC ........ F01P 7/16; F01P 5/10; F01P 5/12; F01P 7/14; F01P 7/161; F01P 7/164;
(Continued)

(56) References Cited

U.S. PATENT DOCUMENTS 4,244,389 A * 1/1981 Shimoura ................ B62D 6/00
137/115.05
4,546,786 A * 10/1985 Koike ...................... B62D 5/08
137/115.08
(Continued)

FOREIGN PATENT DOCUMENTS

DE      33 09 435 A1   10/1983
DE      19539604 A1     4/1997
(Continued)

OTHER PUBLICATIONS

Engish abstract for DE-100 23 519.
(Continued)

*Primary Examiner* — Hung Q Nguyen
*Assistant Examiner* — Anthony Donald Taylor, Jr.
(74) *Attorney, Agent, or Firm* — Fishman Stewart PLLC

(57) ABSTRACT

An electric coolant pump may include a valve device controlled at a discharge side by pressure. The valve device may include a coolant inlet, a first coolant outlet, and a second coolant outlet. The valve device may be configured to at least one of open and close at least one of the first coolant outlet and the second coolant outlet based on a selected operating point and a pressure in a coolant.

20 Claims, 4 Drawing Sheets

(51) Int. Cl.
*F01P 5/12* (2006.01)
*F04D 15/00* (2006.01)
*F16K 31/122* (2006.01)
*F01P 5/10* (2006.01)
*F01P 11/16* (2006.01)

(52) U.S. Cl.
CPC .............. *F01P 7/161* (2013.01); *F01P 7/164* (2013.01); *F04D 15/00* (2013.01); *F04D 15/0016* (2013.01); *F04D 15/0022* (2013.01); *F16K 31/1221* (2013.01); *F01P 7/162* (2013.01); *F01P 11/16* (2013.01); *F01P 2005/125* (2013.01); *F01P 2007/146* (2013.01); *F01P 2025/50* (2013.01)

(58) Field of Classification Search
CPC ...... F01P 7/162; F01P 11/16; F01P 2005/125; F01P 2007/146; F01P 2025/50; F04D 15/00; F04D 15/0016; F04D 15/0022; F16K 31/1221
USPC ...................................... 123/41.08
See application file for complete search history.

(56) References Cited

U.S. PATENT DOCUMENTS

| | | | | |
|---|---|---|---|---|
| 5,038,822 | A * | 8/1991 | Iwata | G05D 7/0126 137/503 |
| 5,218,989 | A * | 6/1993 | Kunimoto | B62D 5/062 137/115.09 |
| 5,443,241 | A * | 8/1995 | Odaira | B60H 1/00485 137/625.5 |
| 5,975,031 | A * | 11/1999 | Bartolazzi | F01P 7/164 123/41.02 |
| 6,205,766 | B1 * | 3/2001 | Dixon | F02C 7/232 60/39.091 |
| 6,539,899 | B1 * | 4/2003 | Piccirilli | F01P 7/167 123/41.08 |
| 8,128,378 | B2 * | 3/2012 | Rowan | F04B 1/29 417/222.1 |
| 2002/0073942 | A1* | 6/2002 | Hollis | F01P 5/10 123/41.44 |
| 2009/0041605 | A1* | 2/2009 | Lamparski | F04C 14/185 418/206.1 |
| 2010/0206250 | A1* | 8/2010 | Baumann | F01P 7/161 123/41.09 |

FOREIGN PATENT DOCUMENTS

| | | | |
|---|---|---|---|
| DE | 100 23 519 A1 | 1/2002 | |
| DE | 10 2013 019 299 A1 | 5/2015 | |
| EP | 0 864 733 A1 | 9/1998 | |
| EP | 0 953 773 A1 | 11/1999 | |
| EP | 2 607 643 A1 | 6/2013 | |
| EP | 2 876 274 A1 | 5/2015 | |
| IT | 0953773 | * 11/1999 | .............. F01P 7/161 |
| WO | 0004283 A1 | 1/2000 | |

OTHER PUBLICATIONS

English abstract for DE-19539604.
English abstract for DE-10 2013 019 299.
English abstract for EP-2876274.

* cited by examiner

ELECTRIC COOLANT PUMP

CROSS-REFERENCE TO RELATED APPLICATIONS

This application claims priority to International Patent Application No. PCT/EP2017/077191 filed on Oct. 24, 2017, to German Patent Application No. DE 10 2016 222 307.0 filed on Nov. 14, 2016, and to German Patent Application No. DE 10 2017 200 876.8 filed on Jan. 19, 2017, the contents of each of which are hereby incorporated by reference in their entirety.

TECHNICAL FIELD

The present invention relates to an electric coolant pump for delivering a coolant. The invention moreover relates to a motor vehicle having an internal combustion engine and such a coolant pump.

BACKGROUND

In modern motor vehicles, a coolant pump is usually used for cooling an internal combustion engine, wherein the cooling power is usually controlled via a thermostat valve. Such a thermostat valve can open a bypass circumventing a radiator, for example when only a low cooling power is required. Such a thermostat valve often possesses an expansion element which enables comparatively simple temperature-dependent control.

However, the coolant pumps known from the prior art are disadvantageous in that they often run at constantly high power and are controlled exclusively via a thermostat valve. A comparatively high amount of energy is thus needed to operate the coolant pump. A further and decisive disadvantage is that the known coolant pumps and the thermostat valves arranged separately therefrom need a comparatively large installation space.

The present invention is therefore concerned with the problem of providing an improved or at least an alternative embodiment for an electric coolant pump, which, in particular, overcomes the disadvantages known from the prior art.

SUMMARY

According to the invention, this problem is solved by the subject mater of the independent claim(s). Advantageous embodiments are the subject matter of the dependent claim(s).

The present invention is based on the general idea, in particular in a motor vehicle, of no longer operating a coolant pump expensively under a constantly high load and therefore with a comparatively high amount of energy, but instead providing a plurality of power stages for the coolant pump in the manner of operating points and moreover providing a valve device which is controlled at the discharge side and by pressure and controls a coolant flow depending on the selected operating point of the coolant pump. The electric coolant pump according to the invention serves in a known manner for delivering a coolant, for example in the cooling circuit of an internal combustion engine, and is adjustable between a plurality of operating points. The electric coolant pump has a valve device which is controlled at the discharge side and by pressure and has a coolant inlet, a first coolant outlet and a second coolant outlet, wherein the valve device is formed such that, depending on the selected operating point of the coolant pump and therefore the pressure p in the coolant, it opens or closes at least the first and/or second coolant outlet or simultaneously opens at least the first and second coolant outlet, wherein, in a preferred embodiment, the valve device is integrated in the coolant pump and thus optimally arranged in terms of the installation space or is arranged separately from the said coolant pump. In this case, it is particularly advantageous if the coolant pump and the valve device form a common unit or the valve device is integrated in the coolant pump. In particular, a particularly compact design can thus be achieved, which is highly advantageous in modern engine compartments and the limited spatial conditions associated therewith. Moreover, such a coolant pump can also be already prefabricated externally and inserted into the motor vehicle as a fully pre-assembled unit, thereby resulting in assembly advantages.

In a further advantageous embodiment of the solution according to the invention, in the first operating point, the coolant pump is switched off and the first coolant outlet is opened. In this case, the first operating point of the coolant pump is therefore synonymous with an off state. In this case, the first operating point is used in particular during a cold-start phase of the internal combustion engine, in which additional cooling of the internal combustion engine is not desired. A second operating point provides a greater delivery power and thus represents a comfort mode, for example, in which only an average cooling power of the internal combustion engine is required, which can also be achieved, for example, via a heat exchanger of an air-conditioning system of a motor vehicle. The third operating point of the cooling pump is represented by a cooling mode in which the valve device is set such that the coolant flow circulates via a radiator, the heat exchanger and the internal combustion engine. In a fourth operating point, a coolant flow is at least intensified, preferably even exclusively via the radiator, whereby more intense cooling is possible. By selecting the operating points, the amount of energy to be used for this is considerably lower than in a coolant pump running constantly under full load, in which, during a cold-start phase, for example, the coolant flow is conducted past the radiator by a valve formed as a bypass valve.

The valve device expediently has a valve body which, in the first and second operating point, assumes a first position, in which it blocks the second coolant outlet and uncovers the first coolant outlet. In this case, the second coolant outlet is connected to a radiator of the motor vehicle, whilst the first coolant outlet is connected, for example, to the heat exchanger of an air-conditioning system of the motor vehicle. In the second operating point, and therefore in the first position of the valve body, in which only an average cooling power is required, the coolant flow is therefore not conducted via the radiator of the motor vehicle. Additionally or alternatively, it can be provided that the valve device has a valve body which, in the third operating point, assumes a second position, in which it uncovers the first coolant outlet and the second coolant outlet. In the third operating point of the coolant pump, and therefore in the second position of the valve body, this therefore brings about a coolant flow which circulates via the radiator, the heat exchanger and the internal combustion engine. In this case, the valve body assumes the second position solely as a result of the increased coolant pressure in the third operating point. In the fourth operating point, the valve body assumes a third position, in which it blocks the first coolant outlet and uncovers the second coolant outlet.

In a further advantageous embodiment of the solution according to the invention, a spring device is provided, which prestresses the valve body in its first position. To adjust the valve body between its first and second position, the coolant pressure must therefore increase, which is usually only achieved if the coolant pump is adjusted from its second operating point to its third operating point. In this case, the coolant pressure p counteracts the pressure $P_F$ applied by the spring device.

A temperature sensor and a control device communicatively connected thereto are expediently provided for controlling the operating points and therefore the power of the coolant pump depending on the temperature of the coolant. To enable the respective operating point of the coolant pump to be selected, it is necessary to determine a cooling requirement, which is possible via the temperature sensor provided according to the invention and the control device communicatively connected thereto according to the invention. Below a particular coolant temperature, for example during a cold-start phase of the internal combustion engine, cooling of the coolant and therefore cooling of the internal combustion engine are not desired, so that, in this case, the control device adjusts the coolant pump to its first operating point, i.e. switches it off or leaves it switched off, for example. If the temperature of the coolant increases, the control device can detect this via the temperature sensor and, according to a characteristic map, for example, adjusts the coolant pump to its second operating point, in which an average cooling power is achieved. If the load on the internal combustion engine increases significantly, for example when driving uphill, the temperature of the coolant also increases, whereupon the control device adjusts the coolant pump to its third operating point, in which the coolant flow is conducted via the heat exchanger and the radiator and not, as in the second operating point, exclusively via a heat exchanger of an air-conditioning system of the motor vehicle, for example, and thus generates a considerably higher cooling power for cooling the internal combustion engine. If the load on the internal combustion engine increases further, then the temperature of the coolant also increases, whereupon the control device adjusts the coolant pump to its fourth operating point, in which the coolant flow is conducted preferably exclusively, but at least increasingly, via the radiator and not, as in the third operating point, additionally via the heat exchanger of the air-conditioning system of the motor vehicle. Therefore, a temperature-dependent control of the operating points of the coolant pump is also possible via the temperature sensor and the control device communicatively connected thereto.

The present invention is further based on the general idea of equipping a motor vehicle with an internal combustion engine, a radiator, a heat exchanger of an air-conditioning system and a coolant pump described above, wherein the coolant inlet and the first coolant outlet are connected to the internal combustion engine, whilst the second coolant outlet is connected to the radiator. Such a motor vehicle according to the invention requires considerably less electrical energy to operate the coolant pump than is the case in the hitherto constantly running coolant pumps. However, not only can electrical energy be saved thereby, but also fuel.

Further important features and advantages of the invention are revealed in the subclaims, in the drawings and in the associated description of the figures with reference to the drawings.

Or course, the features mentioned above and those still to be explained below can be applied not only in the combination described in each case but also in other combinations or in isolation, without deviating from the scope of the present invention.

Preferred exemplary embodiments of the invention are illustrated in the drawings and will be explained in more detail in the description below, wherein identical reference signs relate to identical or similar or functionally identical components.

DETAILED DESCRIPTION

Figure 1:
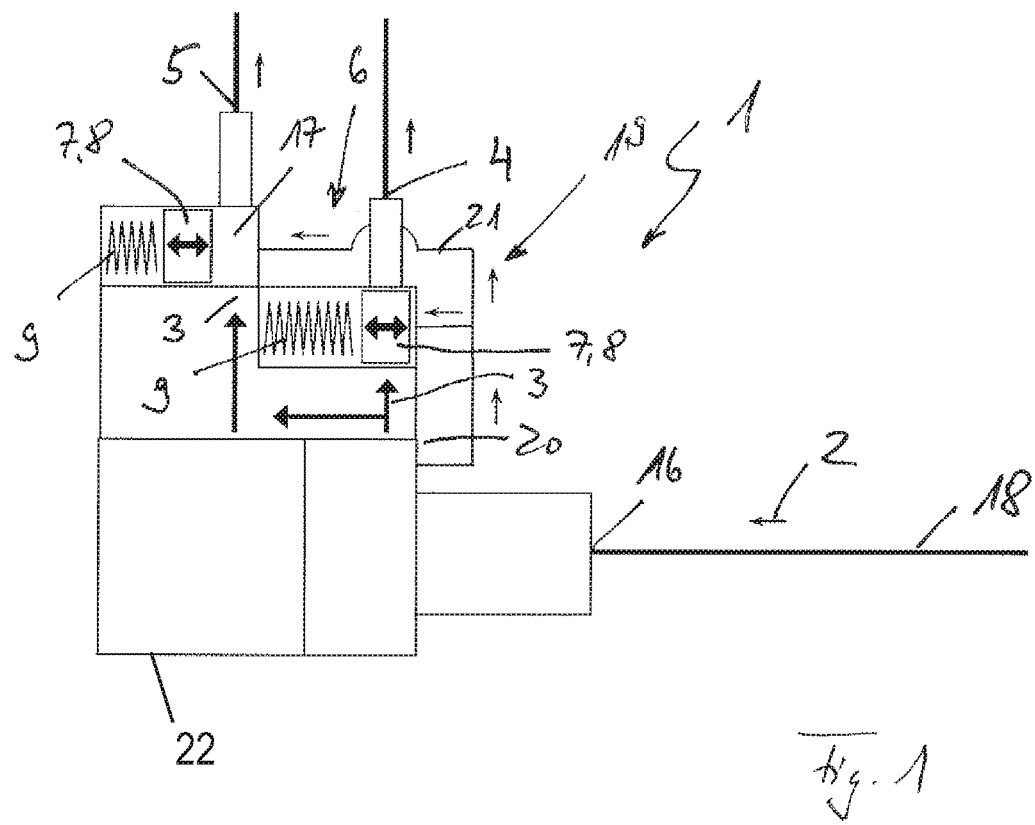
FIG. 1 shows a partly sectional coolant pump according to the invention, having a valve device with valve bodies.
Figure 2:
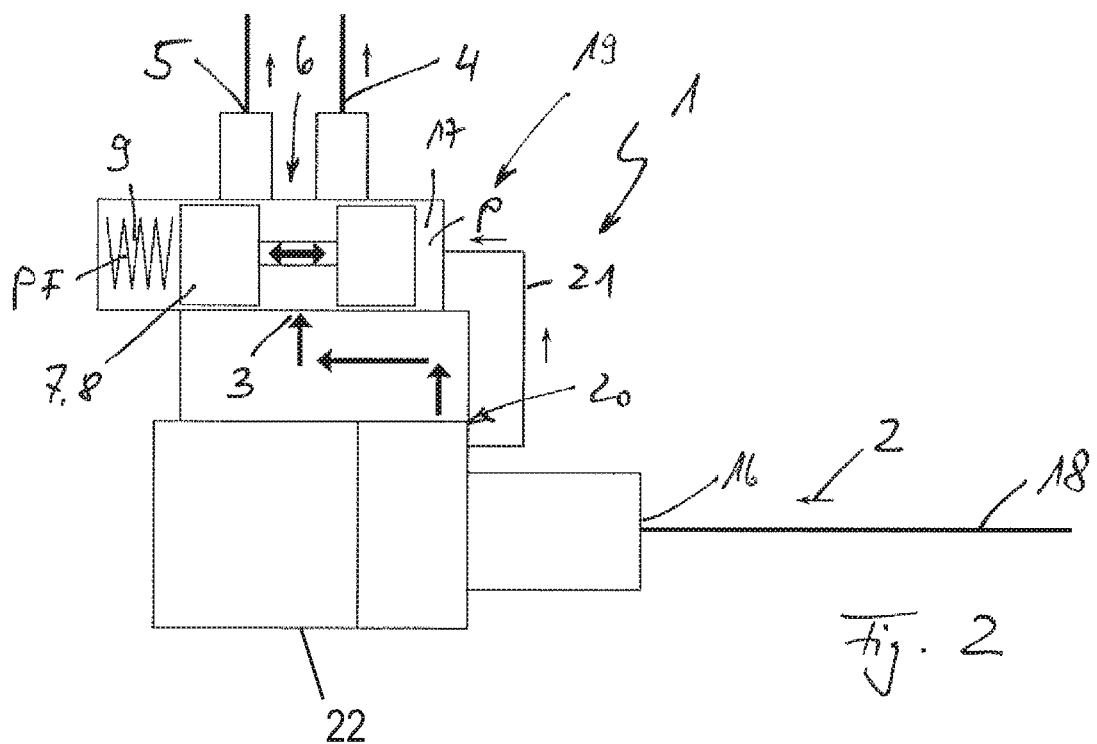
FIG. 2 shows an illustration as in FIG. 1, but with another valve device.
Figure 3:
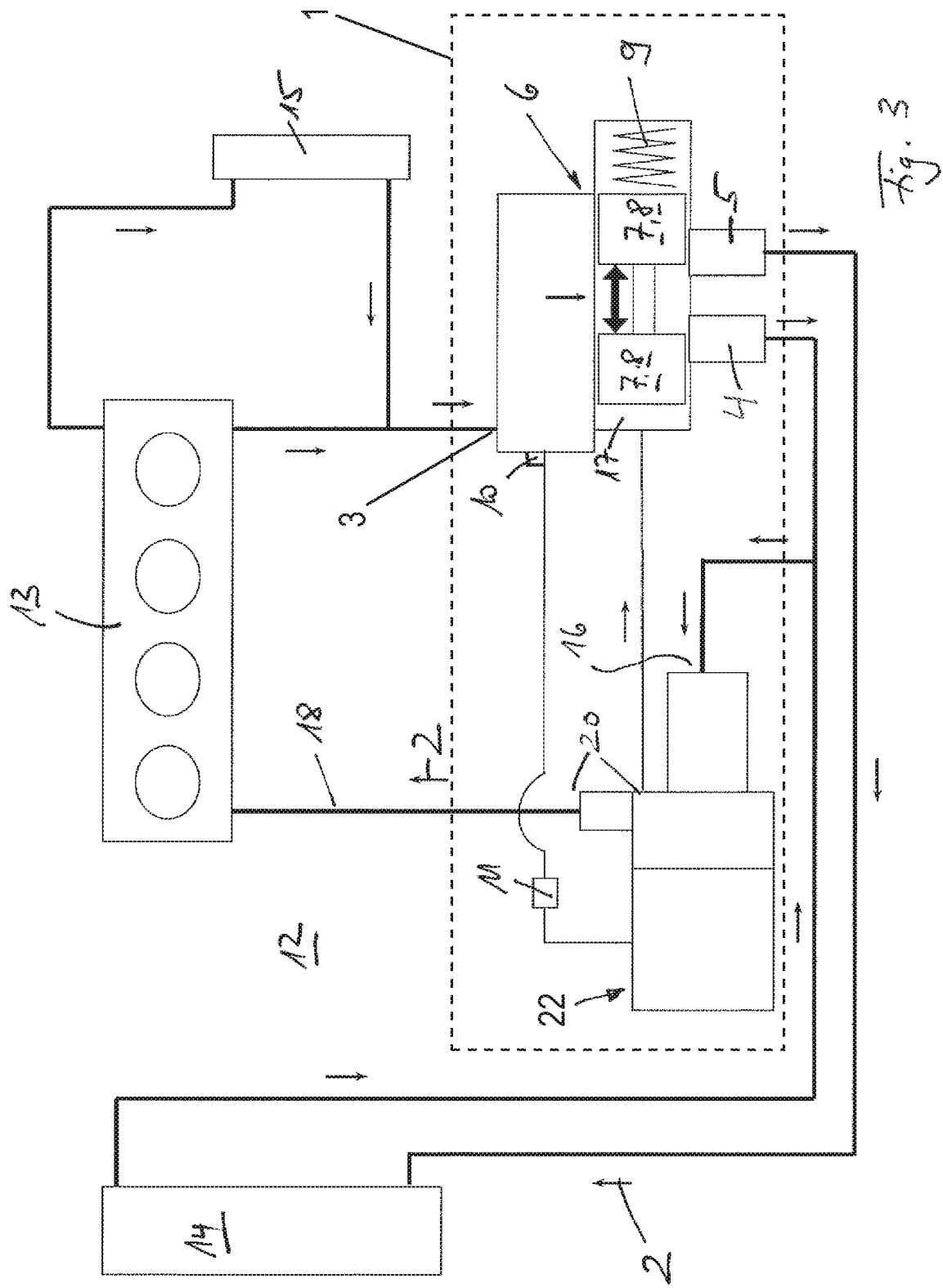
FIG. 3 shows a schematic diagram of an installation situation of the coolant pump according to the invention in a motor vehicle according to the invention.
Figure 4:
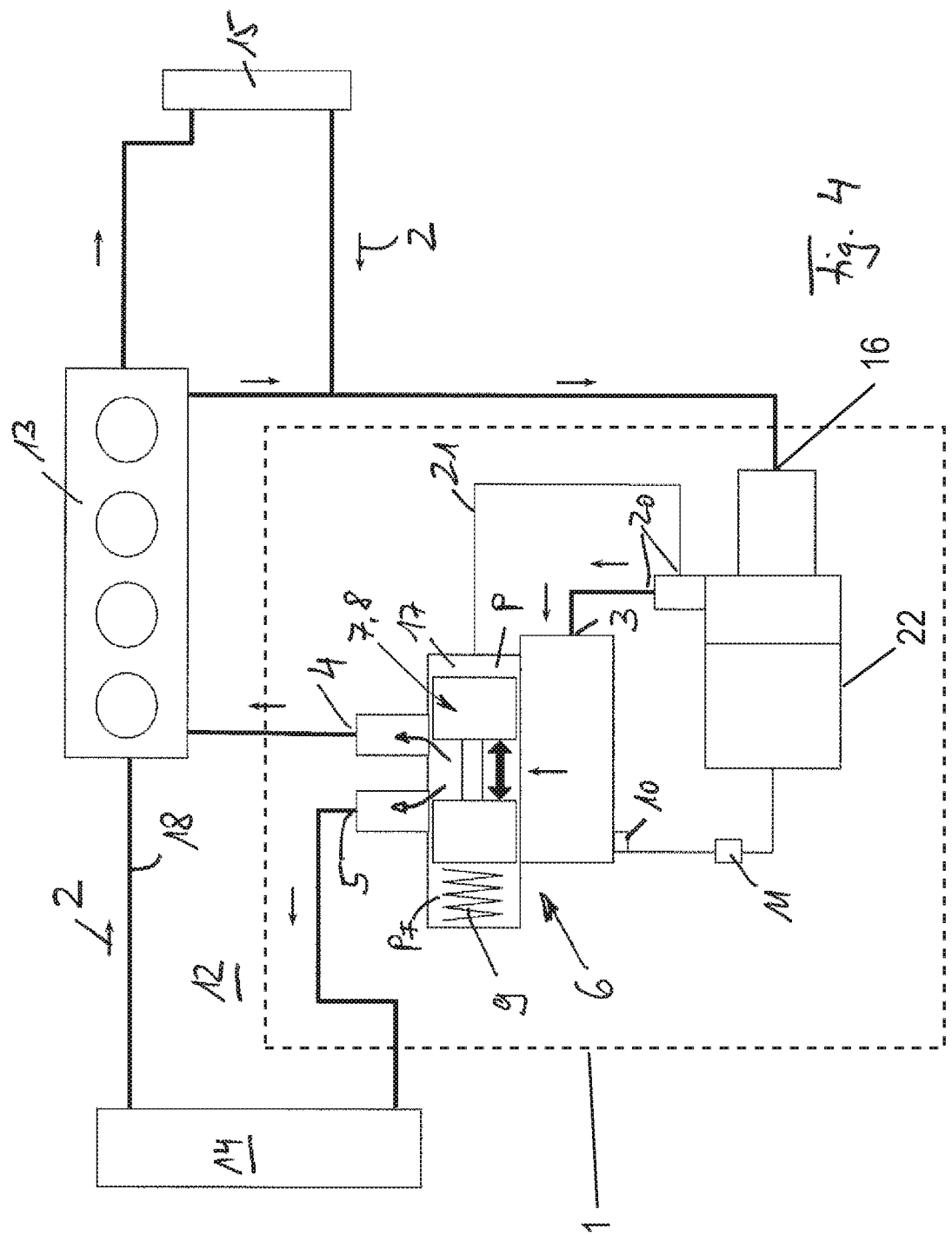
FIG. 4 shows an illustration as in FIG. 3, but with another arrangement of the valve device.

According to FIGS. 1 to 4, an electric coolant pump 1 according to the invention for delivering a coolant 2 has a portion 22 and a valve device 6 which is controlled at the discharge side and by pressure. The valve device 6 has a coolant inlet 3, a first coolant outlet 4 and a second coolant outlet 5. In this case, the coolant pump 1 according to the invention is adjustable between a plurality of operating points, in particular between a first, a second, a third and a fourth operating point. In this case, the valve device 6 is either integrated in the portion 22 (c.f. FIGS. 1 and 2) or is arranged separately from the portion 22 (c.f. FIGS. 3 and 4) and formed such that, depending on the selected operating point of the coolant pump 1 and therefore the coolant pressure p, it opens and/or closes the first or second coolant outlet 4, 5 or simultaneously opens the first and second coolant outlet 4, 5. In this case, controlled at the discharge side and by pressure should be understood to mean that, at the valve device 6, the coolant outlets 4, 5 can be opened/closed by means of a valve body 7 which is adjustable depending on the pressure.

As can be seen in FIGS. 1 and 2, the portion 22 and the valve device 6 are connected and/or integrated with one another such that the coolant pump 1 is formed as a common unit 19 which, compared to hitherto used coolant pumps with thermostat valves arranged separately therefrom, is considerably compacter in design and thus offers considerable advantages in terms of the installation space.

The pressures in the respective operating points are achieved by a corresponding rotational speed of the coolant pump 1, so that, in the second operating point, the coolant pump 1 has a rotational speed at which the first coolant outlet 4 is opened and the second coolant outlet 5 is closed, wherein, in the third operating point, the coolant pump 1 has a rotational speed at which the first coolant outlet 4 and the second coolant outlet 5 are opened, and wherein, in a fourth operating point, the coolant pump 1 has a rotational speed at which the first coolant outlet 4 is closed and the second coolant outlet 5 is opened.

With regard to the construction of the valve device 6 according to the invention, reference is made below to FIGS. 2 and 4, from which it can be seen that the valve device 6 possesses a valve body 7 which, in this case, is formed as an adjustable valve piston 8 and which, in the first and second operating point, assumes a first position (far right), in which it blocks the second coolant outlet 5 and uncovers the first coolant outlet 4. In the third operating point, on the other hand, the valve body 7 assumes a second position, in which it uncovers the first coolant outlet 4 and the second coolant outlet 5 (c.f. FIGS. 3 and 4). In the fourth operating point, the valve body 7 assumes a third position, in which it blocks the first coolant outlet 4 and uncovers the second coolant outlet 5. Moreover, a spring device 9, for example a simple helical spring, is provided, which prestresses the valve body 7 in its first position, in which the second coolant outlet 5 is blocked. In this case, the spring device 9 exerts a force on the valve body 7 which, in relation to the surface thereof, corresponds to a pressure $p_F$. A temperature sensor 10 and a control device 11 communicatively connected thereto can likewise be provided for controlling the operating points of the coolant pump 1 depending on the temperature of the coolant 2. In this case, the valve device 6 is continuously adjustable depending on the rotational speed of the coolant pump 1. In this case, it is, of course, also alternatively conceivable that, instead of the valve body 7 formed as a valve piston 8, the valve device 6 according to the invention can also have other valve bodies 7, so that the valve device 6 can also be formed as a ball valve or as a disk valve, for example.

Observation of FIGS. 3 and 4 now shows a motor vehicle 12 having an internal combustion engine 13, a radiator 14, a heat exchanger 15 in an air-conditioning system which is not otherwise shown, and having a coolant pump 1 according to the passages above. In this case, a coolant inlet 16 of the portion 22 of the coolant pump 1, like the first coolant outlet 4 of the valve device 6, is connected to the internal combustion engine 13, whilst a second coolant outlet 5 of the valve device 6 is connected to the radiator 14.

In this case, in terms of controlling a coolant flow 2, the coolant pump 1 according to the invention functions as follows:

Cooling of the internal combustion engine 13 is not required or desired upon a cold start thereof in order to accelerate the heating of the internal combustion engine 13 and therefore achieve a more rapid lowering of the emissions. During this cold-start phase, the coolant pump 1 is located in its first operating point, in which it does not bring about a build-up of pressure and does not deliver coolant 2 and is therefore switched off. If the temperature of the coolant 2 increases, this is detected via the temperature sensor 10, for example, which, in the present case according to FIG. 1, is arranged in the region of the coolant pump 1, but can, of course, additionally or alternatively also be positioned at another point in the cooling system 18. If the temperature of the coolant 2 reaches a certain value, the control device 11 connected to the temperature sensor 10 adjusts the coolant pump 1 to its second operating point, in which the second coolant outlet 5 is still closed and a coolant flow circulates exclusively via the internal combustion engine 13 and, for example, the heat exchanger 15 of the air-conditioning system of the motor vehicle 12. Also, in this case, only moderate cooling of the internal combustion engine 13 is required in this second operating point. The pressure p of the coolant 2 which is generated in the second operating point is lower than the pressure $p_F$ acting on the valve body 7 by means of the spring device 9, so that the spring device 9 prestresses the valve body 7 in its first position in opposition to the coolant pressure p and fixes it there.

If the temperature of the coolant 2 increases further, this is likewise detected by the temperature sensor 10 and, upon reaching a further limit value, results in the control device 11 adjusting the coolant pump 1 to its third operating point, in which both the delivery power of the coolant pump 1 and also the pressure p generated thereby in the coolant 2 increase significantly. This results in the coolant pressure p being greater than the pressure $p_F$ applied by the spring device 9 so that, in the third operating point, the valve body 7 is adjusted to the right according to FIG. 3, compresses the spring device 9 and simultaneously uncovers the second coolant outlet 5, whereby the coolant flow now circulates via the internal combustion engine 13 and the radiator 14 and via the coolant pump 1 back to the internal combustion engine 13. However, some of the coolant flow 2 still flows via the heat exchanger 15. In this case, the maximum cooling power is produced in the fourth operating point since the coolant pump 1 has a rotational speed at which the first coolant outlet 4 is closed the second coolant outlet 5 of the valve device 6 is opened. In the fourth operating point, the valve body 7 assumes its third position, in which it blocks the first coolant outlet 4 of the valve device 6 and uncovers the second coolant outlet 5 so that all of the coolant flow 2 flows via the internal combustion engine 13 and the radiator 14.

In this case, to control the valve device 6, the portion 22 of the coolant pump 1, according to FIGS. 1 to 5, is connected to a pressure chamber 17 of the valve device 6 at its coolant outlet 20 via a pressure line 21.

In this case, according to FIG. 3, the radiator 14 is arranged upstream of the portion 22 of the coolant pump 1 whilst, according to FIG. 4, it is arranged downstream thereof.

In this case, FIG. 1 shows a valve device 6 which has two spring devices 9 and two valve bodies 7 respectively prestressed thereby. In this case, to realize the inventive idea, the spring strengths of the spring devices 9 are different so that, in the third operating point, only the valve body 7 associated with the first coolant outlet 4 is adjusted, whilst additionally, in the fourth operating point, the valve body 7 associated with the second coolant outlet 5 is also adjusted.

Figure 5:
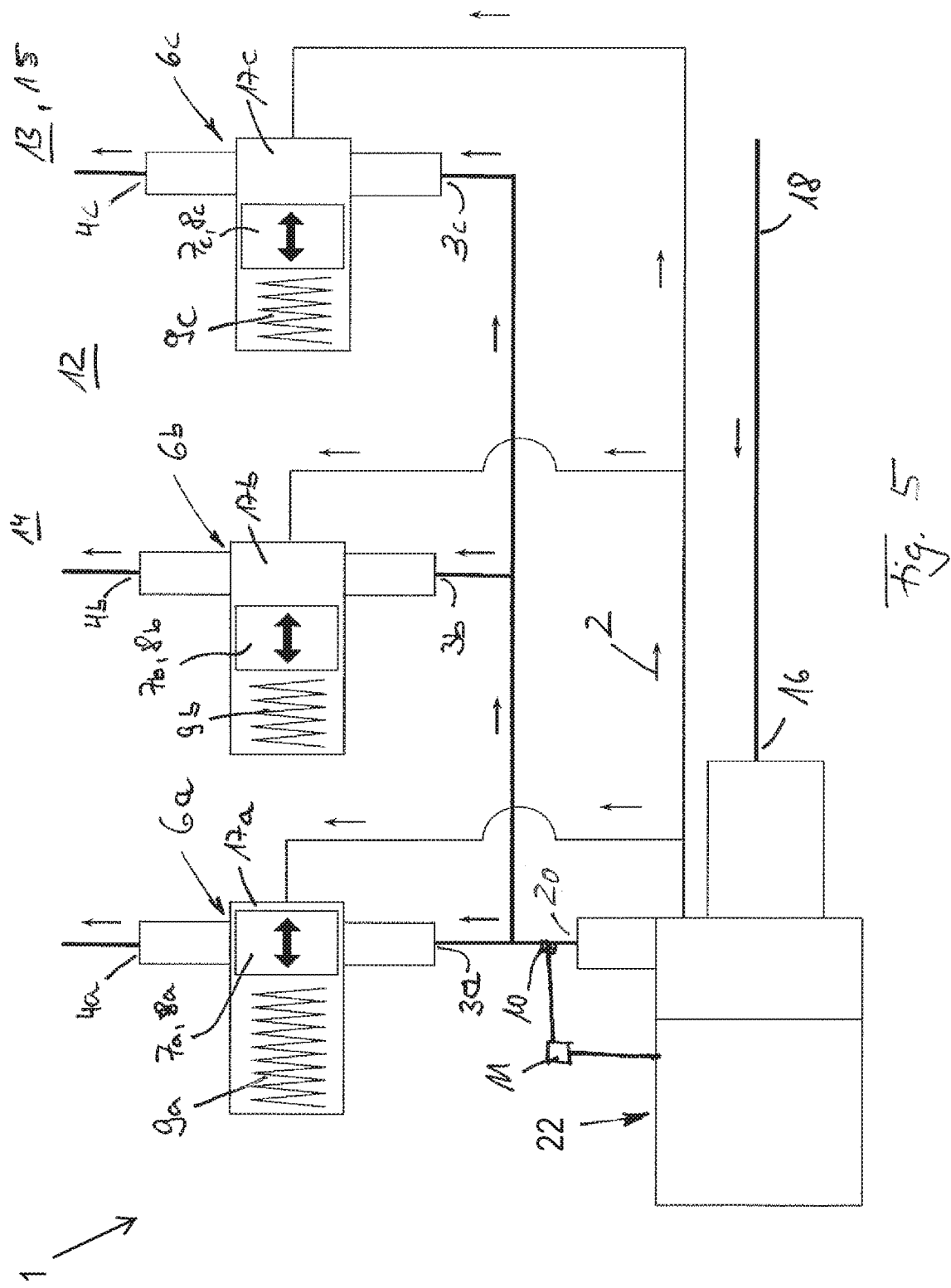
FIG. 5 shows a cooling system which does not fall under the invention, having a coolant pump with three valve units.

According to FIG. 5, a motor vehicle 12 has a cooling system 18 and a coolant pump 1. The, in particular electric, coolant pump 1 is formed for delivering a coolant 2. Likewise provided are valve devices 6a, 6b and 6c which are arranged separately from the portion 22 and each have a coolant inlet 3a, 3b, 3c and a coolant outlet 4a, 4b, 4c, which are connected to an outlet 20 of the portion 22.

In this case, the coolant pump 1 is adjustable between a plurality of operating points, in particular between a first, a second, a third and a fourth operating point. The valve devices 6a, 6b, 6c are formed such that they open, partially open or close depending on the selected operating point of the coolant pump 1 and therefore the coolant pressure p. In this case, the individual coolant outlets 4a, 4b, 4c are connected to individual assemblies, for example a heat exchanger 15 of an air-conditioning system or a radiator 14. As can be seen in FIG. 5, the valve devices 6a, 6b and 6c are arranged separately from the portion 22 and at the discharge side thereof, whereby a decentralized separation of the components 1, 6a, 6b and 6c, which is optimized in terms of the installation space, can also take place.

In the first operating point, the coolant pump 1 is switched off and all valve devices 6a, 6b, 6c are closed. Therefore, a pressure p generated by the coolant pump 1 does not prevail in the cooling system 18.

In the second operating point, the coolant pump 1 generates a pressure p in the coolant 2, at which at least one valve device 6c, and therefore its coolant outlet 4c, are opened and at least one further valve device 6a, 6b and its coolant outlet 4a, 4b are closed, whilst, in a third operating point, the coolant pump 1 generates a pressure p in the coolant 2, at which at least two valve devices 6b, 6c, and therefore their coolant outlets 4b, 4c, are opened and at least one further valve device 6a and its coolant outlet 4a are closed. This is illustrated in FIG. 5. In a fourth operating point, the coolant pump 1 generates a pressure p in the coolant 2/cooling system 18, at which all valve devices 6a, 6b, 6c are opened. In this case, the portion 22 is connected to a respective pressure chamber 17a, 17b, 17c of the associated valve devices 6a, 6b, 6c at its coolant outlet 20.

In this case, a valve body 7a, 7b, 7c which is located in its closed position always closes the associated valve device 6a, 6b, 6c and therefore also its coolant inlets 3a, 3b, 3c or coolant outlets 4a, 4b, 4c.

With regard to the construction of the valve device 6, reference is made below to FIG. 5, from which it can be seen that the valve devices 6a, 6b, 6c each possess a valve body 7a, 7b, 7c which are formed as adjustable valve pistons 8a, 8b, 8c. Moreover, a spring device 9a, 9b, 9c, for example a simple helical spring, is provided in each case, which prestresses the associated valve body 7a, 7b, 7c in its first position, in which the associated valve device 6a, 6b, 6c is in turn blocked.

In the first and second operating point, the valve body 7a, 7b, 7c assumes a first position (c.f. the valve body 7a), in which the associated coolant inlet 3a, 3b, 3c is blocked. In the third operating point, on the other hand, the valve body 7a, 7b, 7c assumes a second position, in which it opens the associated valve device 6a, 6b, 6c and uncovers the associated coolant inlet 3a, 3b, 3c (c.f. valve body 7b, 7c). In this case, the spring device 9a, 9b, 9c exerts a force on the associated valve body 7a, 7b, 7c which, in relation to the surface thereof, corresponds to a pressure $p_F$. In this case, the coolant outlet 20 of the portion 22 is connected to the respective pressure chamber 17a, 17b, 17c of the associated valve devices 6a, 6b, 6c and, depending on the pressure, prestresses the valve body 7a, 7b, 7c in opposition to the spring device 9a, 9b, 9c. In this case, the individual spring devices 9a, 9b, 9c have an individual spring strength, whereby, at the same coolant pressure p, the one valve device 6b, 6c is already opened whilst the other valve device 6a still remains closed. In this case, the valve devices 6a, 6b, 6c are continuously adjustable depending on the rotational speed of the coolant pump 1.

For example, cooling of the internal combustion engine 13 is not required or desired upon a cold start thereof in order to accelerate the heating of the internal combustion engine 13 and therefore achieve a more rapid lowering of the emissions. During this cold-start phase, the coolant pump 1 is located in its first operating point, in which it does not bring about a build-up of pressure and does not deliver coolant 2 and is therefore switched off. If the temperature of the coolant 2 increases, this is detected via the temperature sensor 10, for example, can be positioned at virtually any point in the coolant system 18, in particular also on the internal combustion engine 13. If the temperature of the coolant 2 reaches a certain value, the control device 11 connected to the temperature sensor 10 adjusts the coolant pump 1 to its second operating point, in which the pressure p generated by the delivery power of the coolant pump 1 is at a level such that at least one valve device 6c opens if its spring strength is the lowest, whilst the valve devices 6b and 6a are still closed and a coolant flow 2 circulates exclusively via the internal combustion engine 13 and, for example, the heat exchanger 15 of the air-conditioning system of the motor vehicle 12. In this second operating point, a moderate cooling of the internal combustion engine 13 is required. The pressure p of the coolant 2 which is generated in the second operating point is lower than the pressure $p_F$ acting on the valve body 7a, 7b by means of the spring device 9a, 9b, so that the spring device 9a, 9b prestresses the valve body 7a, 7b in its first position in opposition to the coolant pressure p.

If the temperature of the coolant 2 increases further, this is likewise detected by the temperature sensor 10 and, upon reaching a further limit value, results in the control device 11 adjusting the coolant pump 1 to its third operating point, in which both the delivery power of the coolant pump 1 and also the pressure p generated thereby in the coolant 2 increase. This results in the coolant pressure p being greater than the pressure $p_F$ applied by the spring device 9b so that, in the third operating point, the valve body 7b compresses the spring device 9b and simultaneously uncovers the associated coolant inlet 3b, whereby the coolant flow 2 now circulates via the internal combustion engine 13, the radiator 14 and the heat exchanger 15 and via the coolant pump 1 back to the internal combustion engine 13. Therefore, some of the coolant flow 2 still flows via the heat exchanger 15.

If the temperature of the coolant 2 increases further, this is likewise detected by the temperature sensor 10 and, upon reaching a further limit value, results in the control device 11 adjusting the coolant pump 1 to its fourth operating point, in which both the delivery power of the coolant pump 1 and the pressure p generated thereby in the coolant 2 increase. This results in the coolant pressure p being reached and being greater than the pressure $p_F$ applied by the spring devices 9a, 9b, 9c, so that all of the valve devices 6a, 6b, 6c open in the fourth operating point.

The invention claimed is:

1. An electric coolant pump, comprising:
   a valve device including a valve body controllable via a pressure of a coolant;
   the valve device including a coolant inlet, a first coolant outlet that is openable and closable via a first portion of the valve body, and a second coolant outlet that is openable and closable via a second portion of the valve body; and
   wherein the valve device is configured such that, based on one of a plurality of operating points of the coolant pump and the pressure of the coolant, the first coolant outlet is respectively open or closed via the first portion of the valve body, and the second coolant outlet is respectively open or closed via the second portion of the valve body.

2. The coolant pump as claimed in claim 1, wherein, at a first operating point of the plurality of operating points, the coolant pump is off and at least the first coolant outlet is open.

3. The coolant pump as claimed in claim 2, wherein:
   at a second operating point of the plurality of operating points, the coolant pump has a rotational speed at which the first coolant outlet is open and the second coolant outlet is closed;
   at a third operating point of the plurality of operating points, the coolant pump has a second rotational speed at which the first coolant outlet and the second coolant outlet are open; and at a fourth operating point of the plurality of operating points, the coolant pump has a third rotational speed at which the first coolant outlet is closed and the second coolant outlet is open.

4. The coolant pump as claimed in claim 3, wherein at least one of:
at the first operating point of the coolant pump, the valve body is arranged in a first position, in which the valve body blocks the second coolant outlet and uncovers the first coolant outlet;
at the second operating point of the coolant pump, the valve body is arranged in the first position, in which the valve body blocks the second coolant outlet and uncovers the first coolant outlet;
at the third operating point of the coolant pump, the valve body is arranged in a second position, in which the valve body uncovers the first coolant outlet and the second coolant outlet; and
at the fourth operating point of the coolant pump, the valve body is arranged in a third position, in which the valve body blocks the first coolant outlet and uncovers the second coolant outlet.

5. The coolant pump as claimed in claim 1, wherein the valve device is continuously adjustable based on a rotational speed of the coolant pump.

6. The coolant pump as claimed in claim 1, wherein the valve body is structured as a valve piston and is adjustable in a translatory manner.

7. The coolant pump as claimed in claim 1, further comprising a spring device prestressing the valve body in a first position in which the valve body blocks the second coolant outlet and uncovers the first coolant outlet.

8. The coolant pump as claimed in claim 1, further comprising a temperature sensor attached to the valve device, and a control device communicatively connected thereto and configured to control a power of the coolant pump based on a temperature of the coolant.

9. The coolant pump as claimed in claim 1, further comprising a body portion of the coolant pump, and wherein the valve device is one of (i) arranged separately from the body portion of the coolant pump and connected thereto via a pressure line and (ii) integrated with the body portion of the coolant pump.

10. A motor vehicle, comprising:
an internal combustion engine;
a first heat exchanger configured as a radiator;
a second heat exchanger;
a coolant pump including a body portion and a valve device;
the valve device including a valve body controllable via a pressure of a coolant;
the valve device further including a valve coolant inlet, a first coolant outlet connected to a pump inlet of the body portion of the coolant pump, and a second coolant outlet;
wherein the valve device is configured such that, based on one of a plurality of operating points of the coolant pump and the pressure of the coolant, the first coolant outlet is respectively open or closed via a first portion of the valve body, and the second coolant outlet is respectively open or closed via a second portion of the valve body; and
wherein the first coolant outlet is configured to direct the coolant to the internal combustion engine, and the second coolant outlet is configured to direct the coolant to the radiator.

11. The motor vehicle as claimed in claim 10, wherein, in a first operating point of the plurality of operating points, the coolant pump is off and at least the first coolant outlet is open.

12. The motor vehicle as claimed in claim 11, wherein:
at a second operating point of the plurality of operating points, the coolant pump has a rotational speed at which the first coolant outlet is open and the second coolant outlet is closed;
at a third operating point of the plurality of operating points, the coolant pump has a second rotational speed at which the first coolant outlet and the second coolant outlet are open; and
at a fourth operating point of the plurality of operating points, the coolant pump has a third rotational speed at which the first coolant outlet is closed and the second coolant outlet is open.

13. The motor vehicle as claimed in claim 12, wherein at least one of:
at the first operating point of the coolant pump, the valve body is arranged in a first position, in which the valve body blocks the second coolant outlet and uncovers the first coolant outlet;
at the second operating point of the coolant pump, the valve body is arranged in the first position, in which the valve body blocks the second coolant outlet and uncovers the first coolant outlet;
at the third operating point of the coolant pump, the valve body is arranged in a second position, in which the valve body uncovers the first coolant outlet and the second coolant outlet; and
at the fourth operating point of the coolant pump, the valve body is arranged in a third position, in which the valve body blocks the first coolant outlet and uncovers the second coolant outlet.

14. The motor vehicle as claimed in claim 10, wherein the coolant pump further includes:
a temperature sensor arranged on the valve device; and
a control device communicatively connected to the temperature sensor and configured to control a power of the coolant pump based on a temperature of the coolant.

15. An electric coolant pump, comprising:
a valve device including a pressure chamber and a valve body disposed in the pressure chamber, the valve body controllable via a coolant pressure in the pressure chamber;
the valve device including a coolant inlet, a first coolant outlet that is openable and closable via a first portion of the valve body, and a second coolant outlet that is openable and closable via a second portion of the valve body; and
wherein the valve device is configured such that, based on one of a plurality of operating points of the coolant pump and the coolant pressure in the pressure chamber, a position of the valve body is adjustable such that the first coolant outlet is respectively open or closed via the first portion of the valve body, and the second coolant outlet is respectively open or closed via the second portion of the valve body.

16. The coolant pump as claimed in claim 15, wherein:
at a first operating point of the plurality of operating points, the coolant pump is off and at least the first coolant outlet is open;
at a second operating point of the plurality of operating points, the coolant pump has a rotational speed at which the first coolant outlet is open and the second coolant outlet is closed;

at a third operating point of the plurality of operating points, the coolant pump has a second rotational speed at which the first coolant outlet and the second coolant outlet are open; and at a fourth operating point of the plurality of operating points, the coolant pump has a third rotational speed at which the first coolant outlet is closed and the second coolant outlet is open.

17. The coolant pump as claimed in claim 15, wherein:

the first coolant outlet and the second coolant outlet are disposed laterally adjacent to one another; and the valve body is laterally adjustable within the pressure chamber.

18. The coolant pump as claimed in claim 17, wherein the first portion and the second portion of the valve body are disposed at opposing lateral ends of the valve body.

19. The coolant pump as claimed in claim 1, wherein:

the valve device further includes a first spring device and a second spring device;

the first portion of the valve body is configured as a first valve body and the second portion of the valve body is configured as a second valve body separate from the first valve body;

the first valve body is adjustable into (i) a first valve body first position where the first valve body blocks the first coolant outlet such that the first coolant outlet is closed and (ii) a first valve body second position where the first valve body uncovers the first coolant outlet such that the first coolant outlet is open;

the second valve body is adjustable into (i) a second valve body first position where the second valve body blocks the second coolant outlet such that the second coolant outlet is closed and (ii) a second valve body second position where the second valve body uncovers the second coolant outlet such that the second coolant outlet is open; and the first spring device prestresses the first valve body in the first valve body first position and the second spring device prestresses the second valve body in the second valve body first position.

20. The coolant pump as claimed in claim 19, wherein:

the first spring device prestresses the first valve body in the first valve body first position via a first spring force;

the second spring device prestresses the second valve body in the second valve body first position via a second spring force; and the first spring force and the second spring force are different from one another.

\* \* \* \* \*